United States Patent
Liang et al.

(10) Patent No.: US 12,256,362 B2
(45) Date of Patent: Mar. 18, 2025

(54) METHOD, DEVICE AND COMPUTER STORAGE MEDIUM OF COMMUNICATION

(71) Applicant: NEC CORPORATION, Tokyo (JP)

(72) Inventors: Lin Liang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 344 days.

(21) Appl. No.: 17/788,969

(22) PCT Filed: Dec. 26, 2019

(86) PCT No.: PCT/CN2019/128696
§ 371 (c)(1),
(2) Date: Jun. 24, 2022

(87) PCT Pub. No.: WO2021/128162
PCT Pub. Date: Jul. 1, 2021

(65) Prior Publication Data
US 2022/0408402 A1 Dec. 22, 2022

(51) Int. Cl.
*H04W 68/00* (2009.01)
(52) U.S. Cl.
CPC ................. *H04W 68/005* (2013.01)
(58) Field of Classification Search
CPC . H04W 60/005; H04W 68/005; H04W 76/27; H04W 92/045; H04W 92/20
See application file for complete search history.

(56) References Cited

U.S. PATENT DOCUMENTS

| 2003/0125073 A1 | 7/2003 | Tsai et al. |
| 2014/0274168 A1* | 9/2014 | Xia ............ H04W 68/005 455/458 |
| 2018/0368099 A1 | 12/2018 | Chen et al. |
| 2020/0329455 A1* | 10/2020 | Ryu ............ H04W 76/28 |

(Continued)

FOREIGN PATENT DOCUMENTS

| CN | 109803376 A | 5/2019 |
| EP | 3993527 A1 | 5/2022 |

(Continued)

OTHER PUBLICATIONS

Vivo, "Solution# X: Paging reception for multi-USIM device with 1Rx", 3GPP SA WG2 Meeting #136, S2-1910984, Nov. 18-22, 2019, pp. 1-8 (9 pages).
Extended European Search Report dated Apr. 5, 2023 from the European Patent Office in EP Application No. 19957470.8.
"Solution for paging collision avoidance", S2-1912399 (was S2-1911729+0984+1066), Qualcomm Incorporated, apple, vivo, CATT, SA WG2 Meeting #136, Nov. 18-22, 2019, Reno, USA, 7 pages.

(Continued)

*Primary Examiner* — Kashif Siddiqui
(74) *Attorney, Agent, or Firm* — Sughrue Mion, PLLC

(57) ABSTRACT

Embodiments of the present disclosure relate to methods, devices and computer readable media for communication. A method of communication comprises determining, at a terminal device, whether first paging occasion information of a first paging overlaps with second paging occasion information of a second paging; and in response to the first paging occasion information overlapping with the second paging occasion information, transmitting an indication of paging collision between the first paging and the second paging to a network device associated with the first paging. In this way, the solving of the paging collision issue can be facilitated at RAN side, and low latency and high efficiency can be achieved.

10 Claims, 10 Drawing Sheets

(56) References Cited

U.S. PATENT DOCUMENTS

| | | | | |
|---|---|---|---|---|
| 2020/0396714 A1* | 12/2020 | Lee | .................. | H04W 52/0216 |
| 2020/0413371 A1* | 12/2020 | Ozturk | ................. | H04W 68/02 |
| 2022/0248369 A1* | 8/2022 | Wu | ...................... | H04W 68/02 |
| 2022/0369097 A1* | 11/2022 | Loffe | ................ | H04W 60/005 |

FOREIGN PATENT DOCUMENTS

| | | |
|---|---|---|
| WO | 2013/014000 A1 | 1/2013 |
| WO | 2016/072770 A1 | 5/2016 |
| WO | 2018/161244 A1 | 9/2018 |

OTHER PUBLICATIONS

Written Opinion for PCT/CN2019/128696, dated Aug. 7, 2020.
International Search Report for PCT/CN2019/128696, dated Aug. 7, 2020.
Japanese Office Action dated Jul. 4, 2023 in Japanese Application No. 2022-539219.
Qualcomm Incorporated et al., "Avoidance of paging collisions to minimize outage of services", SA WG2 Meeting #122, S2-174243, Jun. 26-30, 2017, pp. 1-8 (8 pages total).
Intel et al., "Solution for Paging Reception with PO collision avoidance" SA WG2 Meeting #S2-136, S2-1911942, Nov. 18-22, 2019, pp. 1-4 (4 pages total).

* cited by examiner

METHOD, DEVICE AND COMPUTER STORAGE MEDIUM OF COMMUNICATION

CROSS REFERENCE TO RELATED APPLICATIONS

This application is a National Stage of International Application No. PCT/CN2019/128696 filed Dec. 26, 2019.

TECHNICAL FIELD

Embodiments of the present disclosure generally relate to the field of telecommunication, and in particular, to methods, devices and computer storage media of communication during paging monitoring.

BACKGROUND

Currently, a multi-universal subscriber identity module (USIM) terminal device occupies a large market share. Two USIM cards may conform to same or different communication standards such as long term evolution (LTE), new radio (NR) or the like, and the radio frequency (RF) capability of the terminal device may be 1 transmit port (Tx)/1 receive port (Rx), 1Tx/2Rx, 2Tx/2Rx or the like. However, no specification enhancement is made to improve the performance of the multi-USIM terminal device.

In case that a multi-USIM terminal device with 1Tx/1Rx registers to more than one network, e.g. network of USIM A and network of USIM B, the terminal device is unable to simultaneously monitor paging on all third generation partnership project (3GPP) radio access technologies (RATs) in radio resource control (RRC) idle or inactive state. Conventionally, when paging collision occurs between USIM A and USIM B, the terminal device needs to choose one of paging channels associated with USIM A and USIM B to be monitored, which may lead to unsuccessful paging on the other paging channel. Thus, the performance of the multi-USIM terminal device cannot be assured.

SUMMARY

In general, embodiments of the present disclosure provide methods, devices and computer storage media for communication.

In a first aspect, there is provided a method of communication. The method comprises: determining, at a terminal device, whether first paging occasion information of a first paging overlaps with second paging occasion information of a second paging; and in response to the first paging occasion information overlapping with the second paging occasion information, transmitting an indication of paging collision between the first paging and the second paging to a network device associated with the first paging.

In a second aspect, there is provided a method of communication. The method comprises: receiving, at a network device associated with a first paging of a terminal device, an indication of paging collision between the first paging and a second paging of the terminal device, the indication being transmitted by the terminal device to the network device in response to first paging occasion information of the first paging overlapping with second paging occasion information of the second paging.

In a third aspect, there is provided a method of communication. The method comprises: receiving, at a core network element and from a network device associated with a first paging of a terminal device, a first message indicating paging collision between the first paging and a second paging of the terminal device and comprising identity information associated with the first paging, the first message being transmitted by the network device in response to receiving an indication of the paging collision from the terminal device.

In a fourth aspect, there is provided a terminal device. The terminal device comprises a processor and a memory coupled to the processor. The memory stores instructions that when executed by the processor, cause the terminal device to perform the method according to the first aspect of the present disclosure.

In a fifth aspect, there is provided a network device. The network device comprises a processor and a memory coupled to the processor. The memory stores instructions that when executed by the processor, cause the network device to perform the method according to the second aspect of the present disclosure.

In a sixth aspect, there is provided a core network element. The core network element comprises a processor and a memory coupled to the processor. The memory stores instructions that when executed by the processor, cause the core network element to perform the method according to the third aspect of the present disclosure.

In a seventh aspect, there is provided a computer readable medium having instructions stored thereon. The instructions, when executed on at least one processor, cause the at least one processor to perform the method according to the first aspect of the present disclosure.

In an eighth aspect, there is provided a computer readable medium having instructions stored thereon. The instructions, when executed on at least one processor, cause the at least one processor to perform the method according to the second aspect of the present disclosure.

In a ninth aspect, there is provided a computer readable medium having instructions stored thereon. The instructions, when executed on at least one processor, cause the at least one processor to perform the method according to the third aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
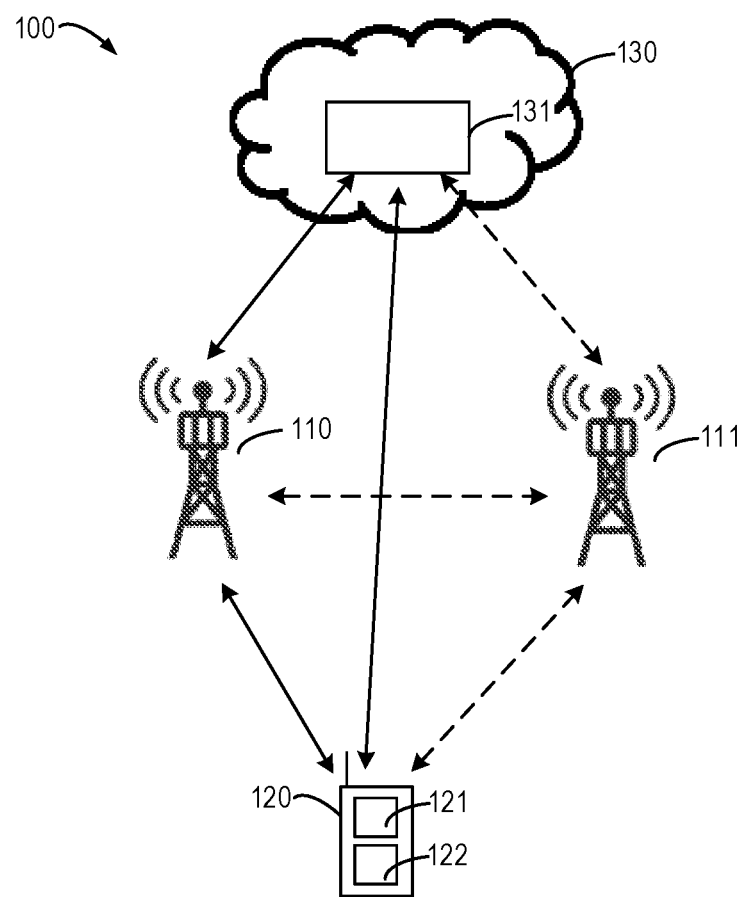
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure.

The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an evolved NodeB (eNodeB or eNB), a next generation NodeB (gNB), a transmission reception point (TRP), a remote radio unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different RATs. In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As mentioned above, conventionally, when paging collision occurs between USIM A and USIM B, the multi-USIM terminal device needs to choose one of paging channels associated with USIM A and USIM B to be monitored. In some cases, the terminal device may only select part of paging occasions based on a time-division multiplexing (TDM) solution at the terminal device side. For example, the terminal device may receive a paging message with a longer paging period, and discard a paging message with a shorter paging period. As another example, the terminal device may prioritize paging occasions of one of USIM cards. In this way, the paging message may be missed and access latency may be introduced.

There is another conventional solution for paging collision at the core network (CN) side. The terminal device may request, through a non-access stratum (NAS) procedure, a core network element to assign new identity information for one of USIM cards, and then determine new paging occasion for the one of USIM cards based on the new identity information. In transmission of the new identity information from the core network element to the terminal device, the connection between the terminal device and a network device serving the one of USIM cards should be activated first. Thus, long delay will be introduced as the paging occasions is calculated by an access stratum (AS) layer and frequent AS/NAS interworking is required. Further, this solution is not suitable for a LTE card as it needs to use a fixed international mobile subscriber identity (IMSI) to calculate the paging occasions. In addition, with the new identity information, the paging occasions of the one of USIM cards may still coincide with the other of USIM cards.

Embodiments of the present disclosure provide an improved solution for communication during paging monitoring. The solution can avoid paging collision with low latency and high efficiency. Principles and implementations of the present disclosure will be described in detail below with reference to the figures.

FIG. 1 illustrates a schematic diagram of an example communication network 100 in which embodiments of the present disclosure can be implemented. As shown in FIG. 1, the communication network 100 may include a network device 110 (also referred to as a first network device 110 hereafter) and a terminal device 120 carrying a first USIM card 121 and a second USIM card 122. The first network device 110 may serve at least one of the first and second USIM cards 121 and 122. The first and second USIM cards 121 and 122 may conform same or different RATs which are existing now or to be developed in the future. It should be noted that the number of the USIM cards carried by the terminal device 120 is not limited to two, and more than two USIM cards also can be applied. For convenience, the following description is given by taking two USIM cards as an example.

As shown in FIG. 1, the communication network 100 may further include at least one neighboring network device 111 (also referred to as a second network device 111 hereafter). Here, only one second network device 111 is shown in FIG. 1 for concise. The neighboring network device 111 may also serve at least one of the first and second USIM cards 121 and 122. For convenience, unless otherwise stated, the following description is made under the assumption that the first network device 110 serves the first USIM card 121 and the second network device 111 serves the second USIM card 122. However, it should be noted that, it is merely an example for illustration, and does not make limitation for the present disclosure. For example, the first and second USIM cards 121 and 122 may be served by the same network device such as the first network device 110 or the second network device 111.

As shown in FIG. 1, the communication network 100 may further include a core network element 131 which is located in a core network 130. The core network element 131 may communicate with the first and second network devices 110 and 111. The terminal device 120 may communicate with the core network element 131 via the NAS layer, and may communicated with the first and second network devices 110 and 111 via the AS layer. For example, in some embodiments, the core network element 131 may perform an access and mobility management function (AMF). It should be noted that the core network element 131 may perform any other additional functions, and the present application does not make limitation in this regard.

Further, the first network device 110 may communicate with the terminal device 120 via a channel such as a wireless communication channel. Similarly, the at least one second network device 111 may also communicate with the terminal device 120 via a channel such as a wireless communication channel. The first and second network devices 110 and 111 may communicate with each other.

It is to be understood that the number of devices in FIG. 1 is given for the purpose of illustration without suggesting any limitations to the present disclosure. The communication network 100 may include any suitable number of network devices and/or terminal devices and/or core network elements adapted for implementing implementations of the present disclosure. In particular, although only one core network 130 is shown in FIG. 1 herein, embodiments of the present disclosure also can be applied to the case of more core networks. For example, the first and second network devices 110 and 111 may be connected to different core networks. Further, although only one core network element 131 is shown in FIG. 1 herein, embodiments of the present disclosure also can be applied to the case of more core network elements. For example, the first and second USIM cards 121 and 122 may correspond to different core network elements.

The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As shown in FIG. 1, in case that the terminal device 120 is in an idle state or in an inactive state, if the core network 130 would transfer data such as voice call data, video call data or the like to the terminal device 120, the core network element 131 will initiate a paging for the terminal device 120. In some embodiments, the core network element 131 may transmit a paging message to the network devices such as the network devices 110 and 111, and then the network device 110 and 111 may transmit respective paging messages. In the meanwhile, the terminal device 120 may monitor the transmission of the paging message.

One terminal device may involve multiple pagings in multiple communication network systems. In some embodiments, the multiple pagings may be associated with multiple identities of the terminal device. It should be noted that the multiple pagings may be associated with other aspects of the terminal device, and the present application does not make limitation for this. For illustration, the following description is given by taking a first paging and a second paging associated with first and second subscriber identity modules of a terminal device as an example.

For example, for the first and second USIM cards 121 and 122 as shown in FIG. 1, the terminal device 120 may involve a first paging associated with the first USIM cards 121 and a second paging associated with the second USIM cards 122. In this case, the terminal device 120 may calculate respective monitoring occasions (also referred to as paging occasion information hereafter). In some embodiments, the paging occasion information may comprise parameters about a paging frame (PF) and a paging occasion (PO). For example, the paging occasion information may comprise at least one of a paging periodic, an on duration, a paging frame offset. For example, 3GPP specifications 38.304 Vf 5.0 (for NR) and 36.304 V15.4.0 (for LTE) specify the calculation as below.

38.304 Vf.5.0

The PF and PO for paging are determined by the following formulae:

SFN for the PF is determined by:

$$(SFN+PF\_offset) \bmod T = (T \text{ div } N)*(UE\_ID \bmod N)$$

Index (i_s), indicating the index of the PO is determined by:

$$i\_s = \text{floor}(UE\_ID/N) \bmod Ns$$

The following parameters are used for the calculation of PF and i_s above:

T: DRX cycle of the UE (T is determined by the shortest of the UE specific DRX value(s), if configured by RRC and/or upper layers, and a default DRX value broadcast in system information. If UE specific DRX is not configured by RRC or by upper layers, the default value is applied).
N: number of total paging frames in T
Ns: number of paging occasions for a PF
PF_offset: offset used for PF determination
UE_ID: 5G-S-TMSI mod 1024

36.304 V15.4.0
PF is given by following equation:

$$SFN \bmod T = (T \text{ div } N) * (UE\_ID \bmod N)$$

Index i_s pointing to PO from subframe pattern will be derived from following calculation:

$$i\_s = \text{floor}(UE\_ID/N) \bmod Ns$$

The following Parameters are used for the calculation of the PF, i_s,

T: DRX cycle of the UE
nB: 4T, 2T, T, T/2, T/4, T/8, T/16, T/32, T/64, T/128, and T/256, and for NB-IoT also T/512, and T/1024.
N: min(T,nB)
Ns: max(1,nB/T)
UE_ID:
If the UE supports E-UTRA connected to 5GC and NAS indicated to use 5GC for the selected cell:
5G-S-TMSI mod 1024, if P-RNTI is monitored on PDCCH.
else
IMSI mod 1024, if P-RNTI is monitored on PDCCH.
IMSI mod 4096, if P-RNTI is monitored on NPDCCH.
IMSI mod 16384, if P-RNTI is monitored on MPDCCH or if P-RNTI is monitored on NPDCCH and the UE supports paging on a non-anchor carrier, and if paging occasion information for non-anchor carrier is provided in system information.

Assuming that first paging occasion information associated with the first USIM card 121 is obtained by the above calculation based on identity information of the first USIM card 121 and second paging occasion information associated with the second USIM card 122 is obtained by the above calculation based on identity information of the second USIM card 122. In some cases, the first paging occasion information may overlap with the second paging occasion information. This is often considered as paging collision.

In view of this, embodiments of the present application provide a solution based on a radio access network (RAN). According to embodiments of the present application, if detecting paging collision between a first paging and a second paging associated with a terminal device, the terminal device may transmit an indication of the paging collision to a network device associated with the first paging. Thereby, by means of RAN, the solving of the paging collision issue may be facilitated with low latency and high efficiency. This will be described in more detail with reference to FIGS. 2A, 2B and 3.

Figure 2A:
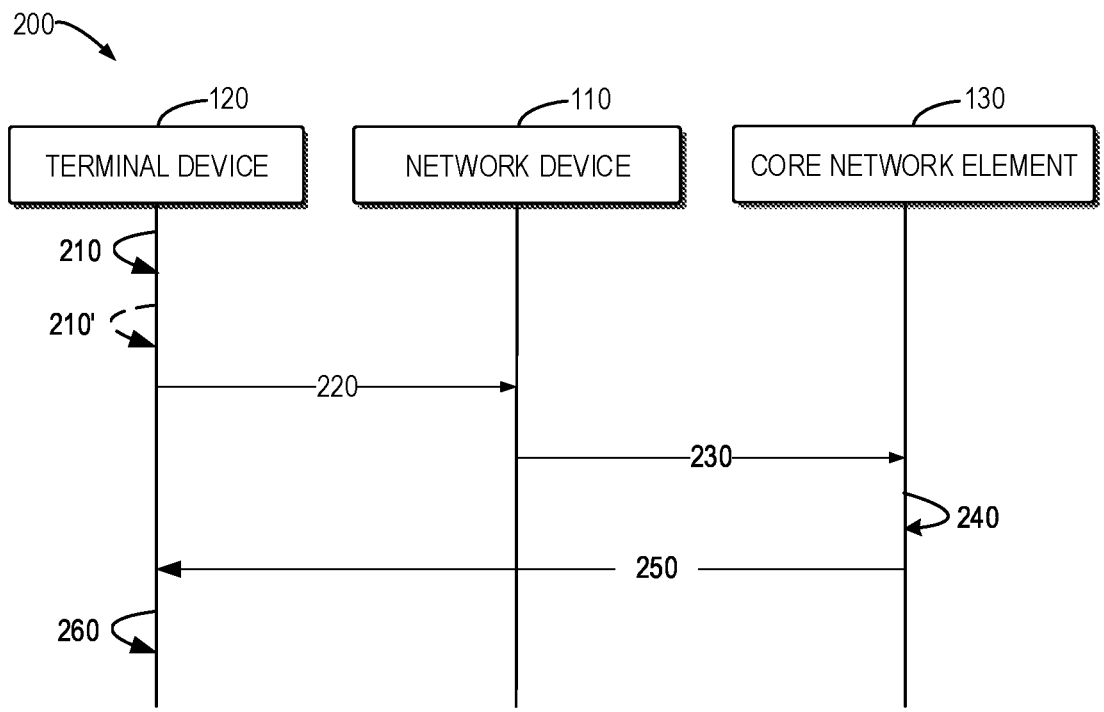
FIG. 2A illustrates a schematic diagram illustrating a process for communication during paging monitoring according to some embodiments of the present disclosure.

FIG. 2A shows a schematic diagram illustrating a process 200 for communication during paging monitoring according to embodiments of the present disclosure. For the purpose of discussion, the process 200 will be described with reference to FIG. 1. The process 200 may involve the terminal device 120, the network device 110 and the core network element 131 as illustrated in FIG. 1. In this embodiment, the network device 111 is assumed as the last serving network device before an inactivation of the terminal device 120.

As shown in FIG. 2A, the terminal device 120 may determine 210 whether the first paging occasion information associated with the first USIM card 121 overlaps with the second paging occasion information associated with the second USIM card 122. In some embodiments, the paging occasion information may include PF and PO. In some embodiments, the terminal device 120 may calculate respective PF and PO for the first and second USIM cards 121 and 122 in accordance with the formulae specified in 3GPP specifications 38.304 Vf.5.0 and 36.304 V15.4.0. It should be noted that any other suitable calculation existing now or to be developed in the future may also be applied, and any other suitable parameters than PF and PO also can be used.

In some embodiments, the terminal device 120 may determine whether the first paging occasion information completely overlaps with the second paging occasion information. If the first paging occasion information partially overlaps with the second paging occasion information, the terminal device 120 may determine 210' an updated first paging occasion information based on prioritization of the first USIM card 121 with respect to the second USIM card 122. For example, in some embodiments, the terminal device 120 may choose to only monitor the second USIM card 122 having a larger paging cycle on a conflicting PF or PO, and thus determine the updated first paging occasion information with the second paging occasion information unchanged. In some alternative embodiments, the terminal device 120 may choose to only monitor the second USIM card 122 as a master card on a conflicting PF or PO, and thus determine the updated first paging occasion information with the second paging occasion information unchanged. In this way, paging collision will be solved at the terminal device 120 in a TDM manner.

On the other hand, if the first paging occasion information completely overlaps with the second paging occasion information, the terminal device 120 may determine that the first paging occasion information overlaps with the second paging occasion information. That is, paging collision is detected. At this moment, the terminal device 120 may transmit 220 an indication of the paging collision to the network device 110. In some embodiments, the terminal device 120 may transmit the indication in a RRC signaling. For example, if paging collision is detected, the terminal device 120 may trigger the initiation of RRC connection towards the first network device 110 directly.

In some embodiments in which the terminal device 120 is in an idle state, the terminal device 120 may transmit the indication by using an establishment cause in RRC setup request message. For example, RRCSetupRequest/RCConnectionSetupRequest message can be used as below.

```
RRCSetupRequest-IEs ::= SEQUENCE {
    ue-Identity                 InitialUE-Identity,
    establishmentCause          EstablishmentCause,
    spare                       BIT STRING (SIZE (1))
}
...
EstablishmentCause ::= ENUMERATED {
emergency, highPriorityAccess, mt-Access, mo-Signalling,
mo-Data, mo-VoiceCall, mo-VideoCall, mo-SMS, mps-PriorityAccess, mcs-PriorityAccess,
pagingCollision, spare5, spare4, spare3, spare2, spare1}
```

In some alternative embodiments in which the terminal device 120 is in an inactive state, the terminal device 120 may transmit the indication by using a resume cause in RRC resume request message. For example, RRCResumeRequest/RRCResumeRequest1/RRCConnectionResumeRequest message may be used as below.

```
RCResumeRequest ::= SEQUENCE {
    rrcResumeRequest            RRCResumeRequest-IEs
}
RRCResumeRequest-IEs ::= SEQUENCE {
    resumeIdentity              ShortI-RNTI-Value,
    resumeMAC-I                 BIT STRING (SIZE (16)),
    resumeCause                 ResumeCause,
    spare                       BIT STRING (SIZE (1))
}
ResumeCause ::= ENUMERATED {emergency, highPriorityAccess, mt-Access,
mo-Signalling,
mo-Data, mo-VoiceCall, mo-VideoCall, mo-SMS, rna-Update, mps-PriorityAccess,
mcs-PriorityAccess, pagingCollsion, spare1, spare2, spare3, spare4}
```

It should be noted that any other suitable manners also can be used to transmit the indication to the network device 110, and the present application does not limit it to the above-list examples.

In some embodiments in which the terminal device 120 is in a connected state, if the terminal device 120 receives, from the core network element 131, updated identity information associated with the first paging, the terminal device 120 may determine whether the first paging occasion information calculated based on the updated identity information overlaps with the second paging occasion information. If the first paging occasion information overlaps with the second paging occasion information, the terminal device 120 may transmit, to the core network element 131, a request for further updated identity information. For example, the terminal device 120 may send a NAS message to the core network element 131 so that the core network element 131 may assign new identity information associated with the first paging to the terminal device 120 for determination updated first paging occasion information In some alternative embodiments in which the terminal device 120 is in a connected state, if the terminal device 120 receives, from the core network element 131, updated identity information associated with the first paging, the terminal device 120 may determine whether the first paging occasion information calculated based on the updated identity information overlaps with the second paging occasion information. If the first paging occasion information overlaps with the second paging occasion information, the terminal device 120 may transmit the indication of paging collision to the network device 110, as described in connection with 220 in FIG. 2A.

In some embodiments, if the terminal device 120 changes from the connected state to an idle or inactive state and moves from the network device 110 to a further network device (for example, the network device 111), the terminal device 120 may determine whether the first paging occasion information overlaps with the second paging occasion information. If the first paging occasion information overlaps with the second paging occasion information, the terminal device 120 may transmit the indication of paging collision to the network device 120, as described in connection with 220 in FIG. 2A.

As shown in FIG. 2A, upon receiving the indication, the network device 110 may transmit 230 a first message to the core network element 131. The first message indicates the paging collision and comprises identity information of the first USIM card 121.

Upon receiving the first message, the core network device 130 may determine 240 updated identity information of the first USIM card 121, and transmit 250 the updated identity information to the terminal device 120. In some embodiments, the core network device 130 may transmit 250 the updated identity information to the terminal device 120 through a NAS procedure. It should be noted that any other suitable manners also can be used to transmit the updated identity information from the core network device 130 to the terminal device 120, and the present application does not make limitation for this.

Upon receiving the updated identity information of the first USIM card 121, the terminal device 120 may determine 260 updated first paging occasion information associated with the first USIM card 121. Thereby, the updated first paging occasion information may be distinguished from the unchanged second paging occasion information, and the paging collision issue may be solved.

Figure 2B:
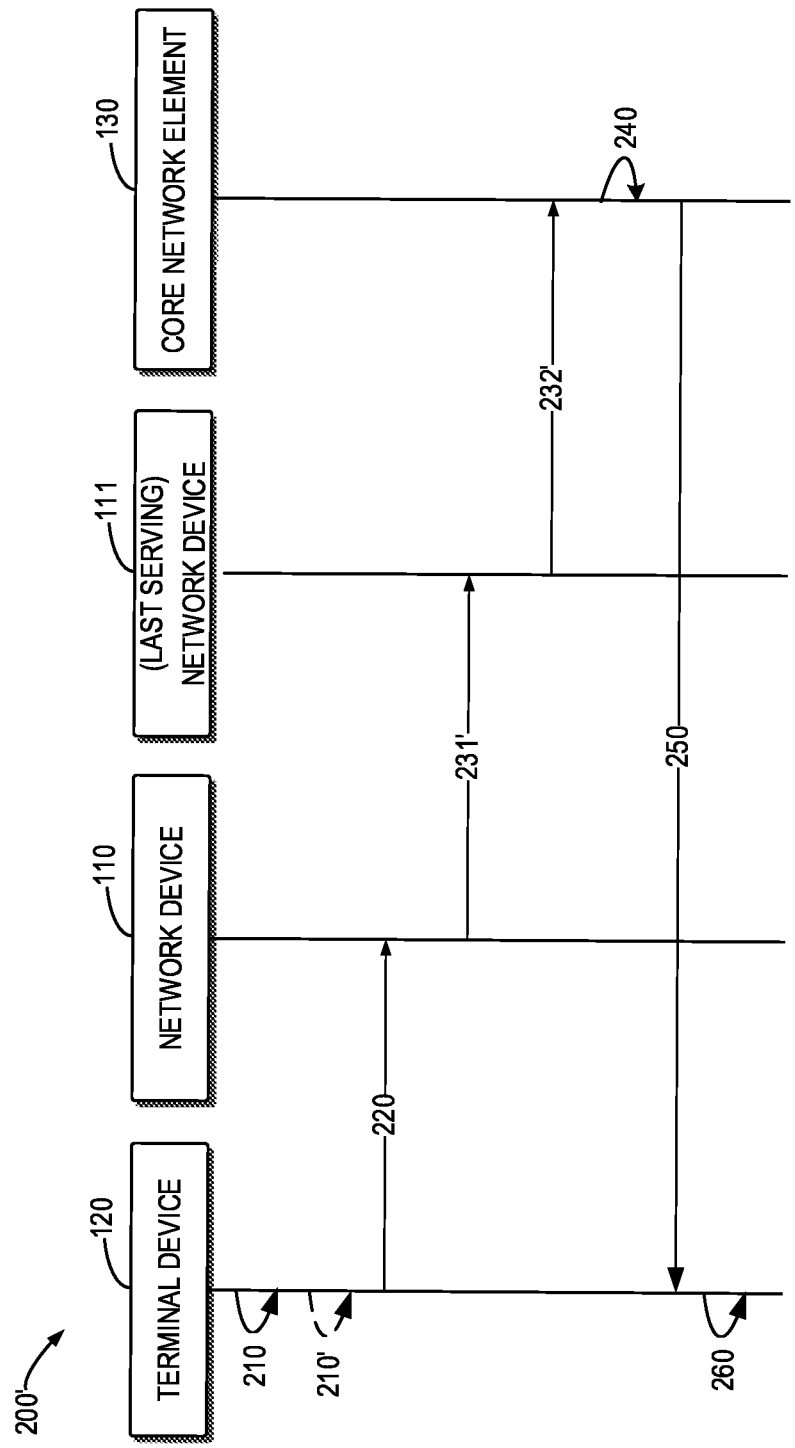
FIG. 2B illustrates a schematic diagram illustrating another process for communication during paging monitoring according to some embodiments of the present disclosure.

FIG. 2B shows a schematic diagram illustrating another process 200' for communication during paging monitoring according to embodiments of the present disclosure. For the purpose of discussion, the process 200' will be described with reference to FIG. 1. The process 200' may involve the terminal device 120, the network device 110, the network device 111 and the core network element 131 as illustrated in FIG. 1. In this embodiment, the network device 110 is assumed as the current serving network device for the terminal device 120, and the network device 111 is assumed as the last serving network device before an inactivation of the terminal device 120. The process 200' is similar with the process 200 described in FIG. 2A except that the processing in 230 of FIG. 2A is replaced with the processing in 231' and 232' of FIG. 2B. For concise, only differences are described hereafter.

As shown in FIG. 2B, upon receiving the indication at 220, the network device 110 may transmit 231' a second message indicating the paging collision to the last serving network device 111. For example, in some embodiments, the network device 110 may transmit the second message by using a resume cause in a RetrieveUEContextRequest message. It should be noted that any other suitable manners also can be used to transmit the second message to the network device 111, and the present application does not limit it to the above-list examples.

Upon receiving the second message, the network device 111 may transmit 232', to the core network element 131, the first message indicating the paging collision and comprising identity information of the first USIM card 121.

The embodiments described in connection with FIGS. 2A and 2B may be considered as a solution for paging collision based on RAN and CN. Comparing with the conventional solutions based on CN, the present solution enables the core network 130 to be aware of the paging collision issue as early as possible, and thus reduces the access latency.

Figure 3:
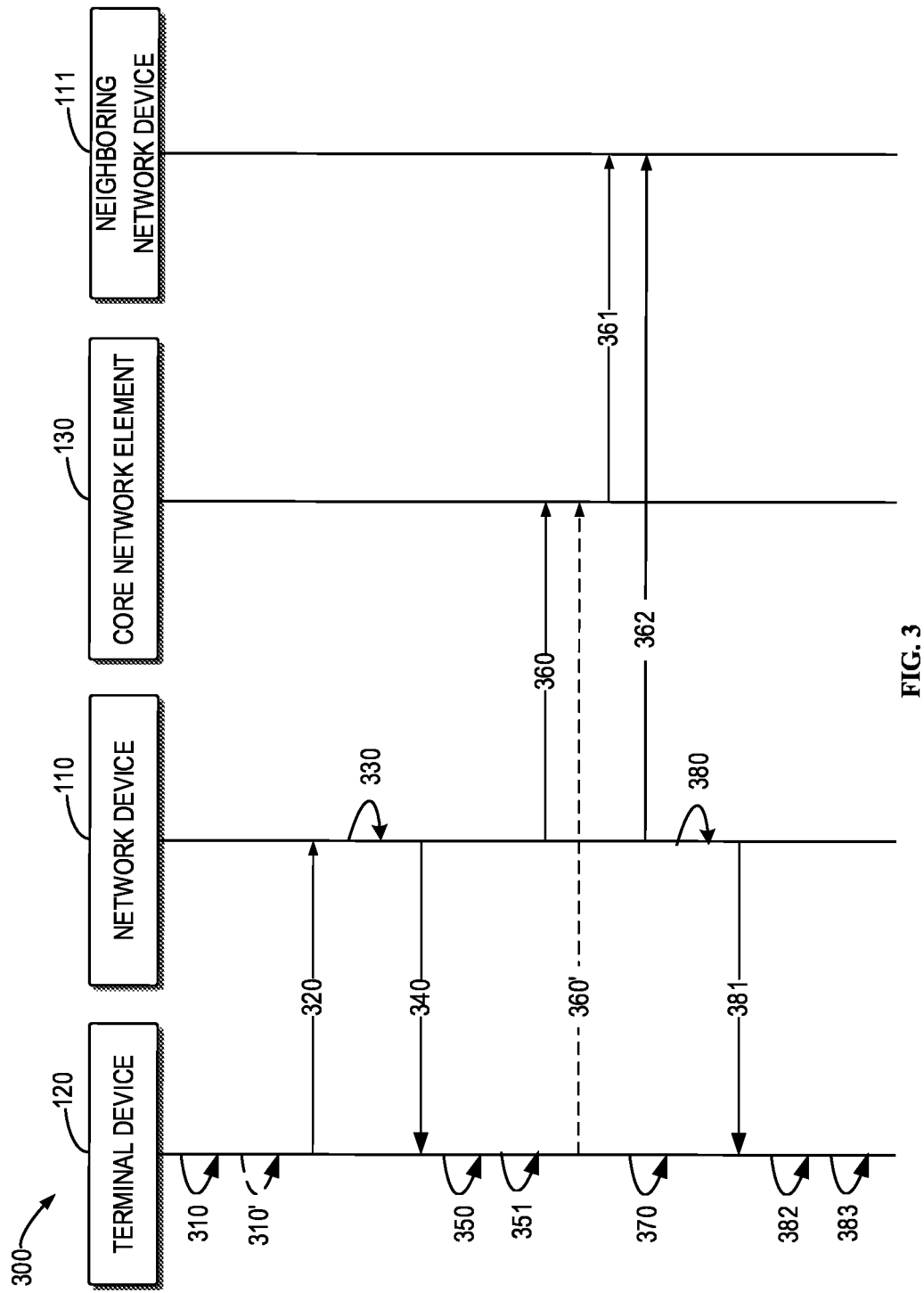
FIG. 3 illustrates a schematic diagram illustrating another process for communication during paging monitoring according to some embodiments of the present disclosure.

FIG. 3 illustrates a schematic diagram illustrating another process 300 for communication during paging monitoring according to some embodiments of the present disclosure. For the purpose of discussion, the process 300 will be described with reference to FIG. 1. The process 300 may involve the terminal device 120, the network device 110 and the neighboring network device 111 and the core network element 131 as illustrated in FIG. 1. For concise, only one neighboring network device 111 is shown as an example and in fact, more neighboring network devices are also feasible.

As shown in FIG. 3, the terminal device 120 may determine 310 whether the first paging occasion information associated with the first USIM card 121 overlaps with the second paging occasion information associated with the second USIM card 122. The processing in this regard is similar with that described in connection with 210 in FIG. 2A, and thus its details are not repeated here.

In some embodiments, the terminal device 120 may determine whether the first paging occasion information completely overlaps with the second paging occasion information. If the first paging occasion information partially overlaps with the second paging occasion information, the terminal device 120 may determine 310' an updated first paging occasion information based on prioritization of the first USIM card 121 with respect to the second USIM card 122. The processing in this regard is similar with that described in connection with 210' in FIG. 2A, and thus its details are not repeated here.

On the other hand, if the first paging occasion information completely overlaps with the second paging occasion information, the terminal device 120 may determine that the first paging occasion information overlaps with the second paging occasion information. That is, paging collision is detected. At this moment, the terminal device 120 may transmit 320 an indication of the paging collision to the network device 110.

In some alternative embodiments, the terminal device 120 may transmit the second paging occasion information associated with the second USIM card 122 along with the indication. For example, in some embodiments, the second paging occasion information may comprise at least one of a paging periodic, an on duration, a paging frame offset. It should be note that the second paging occasion information may comprise more or less parameters. In some alternative embodiments, the terminal device 120 may transmit the first paging occasion information associated with the first USIM card 121 along with the indication. In this way, it may provide a reference for the network device to determine the final offset value.

In some embodiments, the terminal device 120 may determine a candidate for an offset value with respect to the first paging, and transmit the candidate to the network device 110. In some embodiments, the terminal device 120 may transmit the candidate along with the indication. In this way, it also may provide a reference for the network device to determine the final offset value.

In some embodiments, the terminal device 120 may transmit the indication in a RRC signaling. For example, if paging collision is detected, the terminal device 120 may trigger the initiation of RRC connection towards the first network device 110 directly.

In some embodiments in which the terminal device 120 is in an idle state, the terminal device 120 may transmit the indication by using an establishment cause in RRC setup request message. For example, RRCSetupRequest/RCConnectionSetupRequest message may be used to carry the indication.

In some alternative embodiments in which the terminal device 120 is in an inactive state, the terminal device 120 may transmit the indication by using a resume cause in RRC resume request message. For example, RRCResumeRequest/RRCResumeRequest1/RRCConnectionResumeRequest message may be used to carry the indication.

In some alternative embodiments, the terminal device 120 may transmit the indication by using a field in a UEAssistanceInformation message after a connection setup procedure. It should be noted that any other suitable manners also can be used to transmit the indication to the network device 110, and the present application does not limit it to the above-list examples.

In some embodiments, the terminal device 120 only transmit the indication once to the network device 110 if the network device 110 is the last serving network device before an inactivation of the terminal device 120 and a further network device associated with the second paging is unchanged. In other words, the terminal device 120 may only initiate the RRC connection for paging collision issue once in the current cell, if the cell associated with the second paging is not changed. In this way, repeated initiation of the RRC connection due to reoccurrence of paging collision can be avoided.

As shown in FIG. 3, upon receiving the indication, the network device 110 may determine 330 an offset value with respect to the first paging. In some embodiments in which the candidate for the offset value is transmitted along with the indication, the network device 110 may determine the offset value based on the candidate. In some embodiments in which the second paging occasion information is transmitted along with the indication, the network device 110 may determine the offset value based on the second paging occasion information. In some embodiments in which both the candidate for the offset value and the second paging occasion information are transmitted along with the indication, the network device 110 may determine the offset value based on the candidate and the second paging occasion information.

Upon determining the offset value, the network device 110 may transmit 340 the offset value to the terminal device 120. In some embodiments, the network device 110 may transmit the offset value in a RRC signaling. In some embodiments, the network device 110 may transmit the offset value in at least one of a RRC reconfiguration message and a RRC release message. For example, in some embodiments, the offset value may be included in a RRCReconfiguration/RRCConnectionReconfiguration message. In some alternative embodiments, the offset value may be included in a RRCRelease/RRCConnectionRelease message.

Upon receiving the offset value, the terminal device 120 may determine 350 updated identity information of the first USIM card 121 based on the offset value. In some embodiments of the NR system, the updated identity information may be determined by the following equation (1).

$$UE\_ID = (5G\text{-}S\text{-}TMSI + offset) \bmod 1024 \quad \text{equation (1)}$$

where 5G-S-TMSI denotes the identity information of the first USIM card 121, and UE_ID denotes the updated identity information of the first USIM card 121.

In some embodiments of the LTE system, the updated identity information may be determined by the following equations (2)-(5).

if the UE supports E-UTRA connected to 5GC and NAS indicated to use 5GC for the selected cell:

$$UE\_ID = (5G\text{-}S\text{-}TMSI + offset) \bmod 1024, \text{ if P-RNTI is monitored on PDCCH} \quad \text{equation (2)}$$

else $$UE\_ID = (IMSI + offset) \bmod 1024, \text{ if P-RNTI is monitored on PDCCH} \quad \text{equation (3)}$$

$$UE\_ID = (IMSI + offset) \bmod 4096, \text{ if P-RNTI is monitored on NPDCCH} \quad \text{equation (4)}$$

$$UE\_ID = (IMSI + offset) \bmod 16384, \text{ if P-RNTI is monitored on MPDCCH or if P-RNTI is monitored on NPDCCH and the UE supports paging on a non-anchor carrier, and if paging occasion information for non-anchor carrier is provided in system information} \quad \text{equation (5)}$$

where IMSI denotes the identity information of the first USIM card 121, and UE_ID denotes the updated identity information of the first USIM card 121.

Upon determining the updated identity information of the first USIM card 121, the terminal device 120 may determine 351 updated first paging occasion information associated with the first USIM card 121.

The present embodiment described in FIG. 3 may be considered as a solution for paging collision based on only RAN. Comparing with the conventional solutions based on CN, the present solution enables the paging collision issue to be solved by the AS layer and transparent to the NAS layer, and the procedure is low latency and more efficient.

It is also noted by the present inventor that, neighboring network devices such as the network device 110 may have the same paging configuration (paging parameters). If the offset value of the last serving network device is not known to the neighboring network devices, it is possible that the paging collision happens again if the terminal device 120 performs cell reselection. In view of this, embodiments of the present disclosure also provide a scheme of propagation of the offset value from the network device 110 to the neighboring network devices such as the network device 111. Its details are described below with reference to FIG. 3.

As shown in FIG. 3, in some embodiments, upon determining the offset value, the network device 110 may transmit 360 the offset value and the identity information of the first USIM card to the core network element 131. In some alternative embodiments, the terminal device 120 may transmit 360' the offset value and the identity information of the first USIM card to the core network element 131. For example, the terminal device 120 may transmit 360' the offset value and the identity information of the first USIM card through the NAS procedure.

Upon receiving the offset value and identity information of the first USIM card, the core network element 131 may transmit 361, for example in a paging message, the offset value and the identity information of the first USIM card. In this way, neighboring network devices (at least one second network device) having the same paging configuration as that of the network device 110 (first network device) can receive the offset value and the identity information of the first USIM card. For example, the identity information of the first USIM card may be at least one of 5G-S-TMSI, S-TMSI and IMSI. Thereby, the neighboring network device can use the offset value received from the core network element 131 to determine updated paging configuration for transmission of a RAN paging message.

For example, in some embodiments, the paging message may be shown in Table 1.

TABLE 1

Paging Message for CN paging

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| UE Identity Index Value | M | | 9.3.3.23 | | YES | ignore |
| UE Paging Identity | M | | 9.3.3.18 | | YES | ignore |
| Paging DRX | O | | 9.3.1.90 | | YES | ignore |
| TAI List for Paging | | 1 | | | YES | ignore |
| >TAI List for Paging Item | | 1 . . . <maxnoofTAIforPaging> | | | — | |
| >>TAI | M | | 9.3.3.11 | | — | |
| Paging Priority | O | | 9.3.1.78 | | YES | ignore |
| UE Radio Capability for Paging | O | | 9.3.1.68 | | YES | ignore |

TABLE 1-continued

Paging Message for CN paging

| IE/Group Name | Presence | Range | IE type and reference | Semantics description | Criticality | Assigned Criticality |
|---|---|---|---|---|---|---|
| Assistance Data for Paging | O | | 9.3.1.69 | | YES | ignore |
| Paging Origin | O | | 9.3.3.22 | | YES | ignore |
| Offset | O | | x.x.x.x | | YES | ignore |

In some alternative embodiments, upon determining the offset value, the network device 110 may directly transmit 362, for example in a paging message, the offset value and the identity information of the first USIM card to the neighboring network devices (at least one second network device) having the same paging configuration as that of the network device 110 (first network device). For example, the identity information of the first USIM card may be at least one of 5G-S-TMSI, S-TMSI, IMSI and I-RNTI. Thereby, the neighboring network device can use the offset value received from the last serving network device to determine updated paging configuration for transmission of a RAN paging message.

For example, in some embodiments, the paging message may be shown in Table 2.

embodiments, if the terminal device 120 has moved from the network device 110 to a network device in the list, the terminal device 120 may reuse 382 the offset value to determine the updated first paging occasion information. In some embodiments, if the terminal device 120 has moved from the network device 110 to a network device being not in the list, the terminal device 120 may use 383 a predetermined value to determine the updated first paging occasion information. For example, the predetermined value may be zero. It should be noted that the predetermined value may be suitably determined as needed.

In this way, the same procedure is made for RAN paging and CN paging. This is better for the case of CN paging, as CN is not aware of the paging configuration of RAN.

TABLE 2

Paging Message for RAN paging

| IE/Group Name | Presence | Range | IE type and reference | Semantics description | Criticality | Assigned Criticality |
|---|---|---|---|---|---|---|
| Message Type | M | | 9.2.3.1 | | YES | reject |
| CHOICE UE Identity Index Value | M | | | | YES | reject |
| >Length-10 | | | | | | |
| >>Index Length-10 | M | | BIT STRING (SIZE(10)) | Coded as specified in TS 38.304 [33] and TS 36.304 [34]. | — | |
| UE RAN Paging Identity | M | | 9.2.3.43 | | YES | ignore |
| Paging DRX | M | | 9.2.3.66 | | YES | ignore |
| RAN Paging Area | M | | 9.2.3.38 | | YES | reject |
| Paging Priority | O | | 9.2.3.44 | | YES | ignore |
| Assistance Data for RAN Paging | O | | 9.2.3.41 | | YES | ignore |
| Offset | O | | x.x.x.x | | YES | ignore |

In some embodiments in which the terminal device 120 performs cell reselection (i.e., moving from a first network device to a second network device), the terminal device 120 may reuse the offset value to determine the updated first paging occasion information. In this way, the propagation of the offset value for the calculation of paging occasion is supported between neighboring network devices. As the paging configuration of neighboring network devices can be the same, the offset value can be reused if the terminal device performs cell reselection.

In some alternative embodiments, the network device 110 may determine 380 a list of the neighboring network devices having the same paging configuration as that of the network device 110, and transmit 381 the list to the terminal device 120. In some embodiments, the list may be transmitted to the terminal device 120 along with the offset value. It should be noted that the list may be transmitted in any other suitable ways.

The terminal device 120 may determine paging occasion information when performing cell reselection. In some It should be note that actions shown in FIGS. 2A, 2B and 3 are not always necessary for implementing embodiments of the present disclosure, and more or less actions may be adapted as needed. Corresponding to the processes described in FIGS. 2A, 2B and 3, embodiments of the present disclosure provide methods of communication implemented at a network device, at a terminal device and at a core network element. These methods will be described below with reference to FIGS. 4 to 12.

Figure 4:
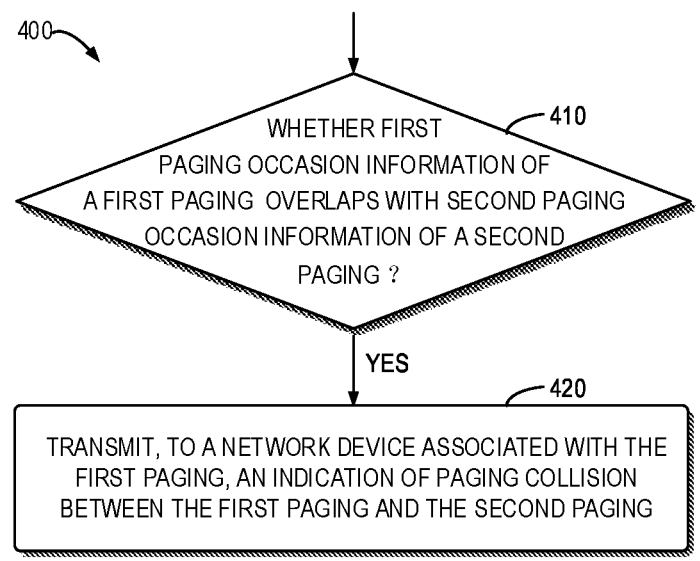
FIG. 4 illustrates an example method of communication implemented at a terminal device in accordance with some embodiments of the present disclosure.

FIG. 4 illustrates an example method 400 of communication implemented at a terminal device in accordance with some embodiments of the present disclosure. For example, the method 400 may be performed at the terminal device 120 as shown in FIG. 1. For the purpose of discussion, in the following, the method 400 will be described with reference to FIG. 1. It is to be understood that the method 400 may include additional blocks not shown and/or may omit some blocks as shown, and the scope of the present disclosure is not limited in this regard.

As shown in FIG. 4, at block 410, the terminal device 120 may determine whether first paging occasion information of a first paging overlaps with second paging occasion information of a second paging. The determination of the first paging occasion and the second paging occasion is similar with that described in connection with 210 in FIG. 2A, and thus other details are not repeated here.

In some embodiments, the terminal device 120 may determine whether the first paging occasion information overlaps with the second paging occasion information completely. If the first paging occasion information overlaps with the second paging occasion information completely, the terminal device 120 may determine that the first paging occasion information overlaps with the second paging occasion information.

In some embodiments, if the first paging occasion information overlaps with the second paging occasion information partially, the terminal device 120 may determine the updated first paging occasion information based on prioritization of the first subscriber identity module with respect to the second subscriber identity module. The processing in this regard is similar with that described in connection with 210' in FIG. 2A, and thus other details are not repeated here.

If determining at block 410 that the first paging occasion information overlaps with second paging occasion information, at block 420, the terminal device 120 may transmit, to a network device (such as the network device 110) associated with the first paging, an indication of paging collision between the first paging and the second paging. In this way, the network device can initiate the solving of the paging occasion.

In some embodiments, the terminal device 120 may transmit the indication in a RRC signaling. In some embodiments in which the terminal device 120 is in an idle state, the terminal device 120 may transmit the indication by using an establishment cause in RRC setup request message. In some embodiments in which the terminal device 120 is in an inactive state, the terminal device 120 may transmit the indication by using a resume cause in RRC resume request message. The processing in this regard is similar with that described in connection with 220 in FIG. 2A, and thus other details are not repeated here.

In some embodiments, in response to receiving, from the core network element 131, updated identity information associated with the first paging while being in a connected state, the terminal device 120 may determine whether the first paging occasion information based on the updated identity information overlaps with the second paging occasion information. In response to the first paging occasion information overlapping with the second paging occasion information, the terminal device 120 may perform at least one of the following: transmit, to the core network element 131, a request for further updated identity information; or transmit the indication of paging collision to the network device 120.

In some embodiments, in response to changing from the connected state to an idle or inactive state and moving from the network device to a further network device, the terminal device 120 may determine whether the first paging occasion information overlaps with the second paging occasion information. In response to the first paging occasion information overlapping with the second paging occasion information, the terminal device 120 may transmit the indication of paging collision to the network device 120.

In some embodiments, the terminal device 120 may only transmit the indication once in response to the network device 110 being the last serving network device before an inactivation of the terminal device 120 and a further network device associated with the second paging being unchanged.

In some embodiments, the terminal device 120 may determine a candidate for an offset value with respect to the first paging, and transmit the candidate to the network device 110. In some embodiments, the terminal device 120 may transmit the candidate along with the indication. In this way, the offset value may be determined by the network device based on the candidate.

In some embodiments, the terminal device 120 may transmit the second paging occasion information to the network device 110. In some embodiments, the terminal device 120 may transmit the second paging occasion information along with the indication. In this way, the offset value may be determined by the network device based on the second paging occasion information as a reference.

In some embodiments, the terminal device 120 may receive, from a core network element (such as the core network element 131 in FIG. 1), updated identity information associated with the first paging and determine updated first paging occasion information based on the updated identity information. The updated identity information is determined by the core network element 131 in response to receiving a first message, the first message being transmitted from the network device 120 in response to receiving the indication and the first message indicating the paging collision and comprising identity information associated with the first paging. This will be described in more detail with reference to FIG. 5.

Figure 5:
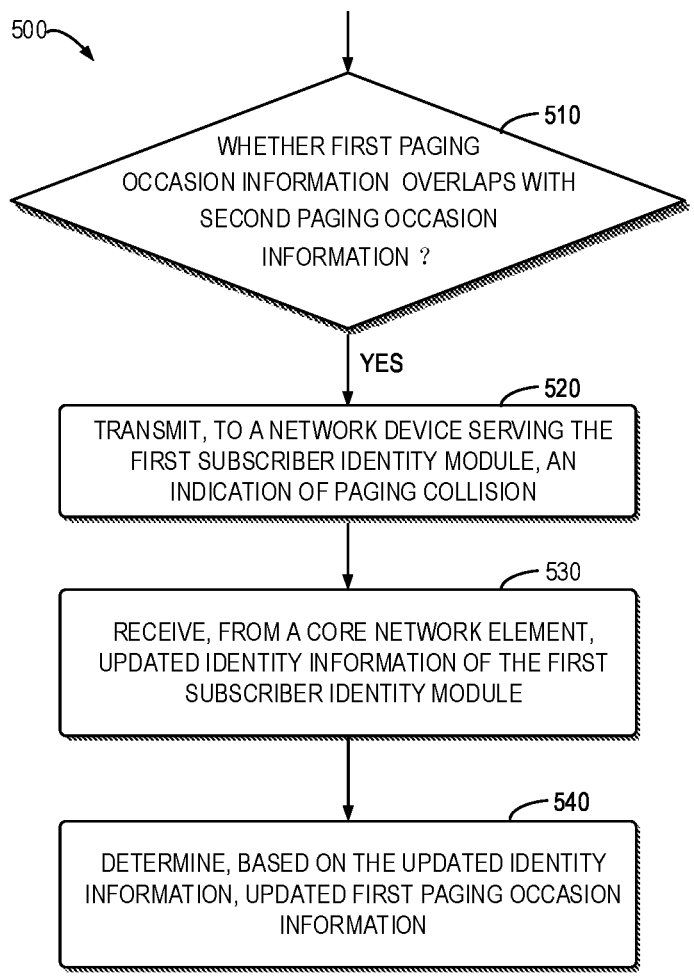
FIG. 5 illustrates another example method of communication implemented at a terminal device in accordance with some embodiments of the present disclosure.

FIG. 5 illustrates another example method 500 of communication implemented at a terminal device in accordance with some embodiments of the present disclosure. For example, the method 500 may be performed at the terminal device 120 as shown in FIG. 1. For the purpose of discussion, in the following, the method 500 will be described with reference to FIG. 1. It is to be understood that the method 500 may include additional blocks not shown and/or may omit some blocks as shown, and the scope of the present disclosure is not limited in this regard. In this embodiment, the first paging is associated with a first subscriber identity module (such as the first USIM card 121) of the terminal device 120, and the second paging is associated with a second subscriber identity module (such as the second USIM card 122) of the terminal device 120.

As shown in FIG. 5, at block 510, the terminal device 120 may determine whether first paging occasion information associated with the first subscriber identity module overlaps with second paging occasion information associated with the second subscriber identity module. The processing in this regard is similar with that described in connection with 210 in FIG. 2A, and thus other details are not repeated here.

If determining at block 510 that the first paging occasion information overlaps with second paging occasion information, at block 520, the terminal device 120 may transmit, to a network device (such as the network device 110) serving the first subscriber identity module, an indication of paging collision between the first and second subscriber identity modules, for the network device 110 to transmit a first message to a core network element (such as the core network element 131). In some embodiments, the first message may indicate the paging collision and may comprise identity information of the first subscriber identity module. The processing in this regard is similar with that described in connection with 220 in FIG. 2A, and thus other details are not repeated here.

At block 530, the terminal device 120 may receive, from a corresponding core network element (such as the core network element 131), updated identity information of the first subscriber identity module. In some embodiments, the updated identity information is assigned by the core network element 131 in response to receiving the first message. The processing in this regard is similar with that described in connection with 250 in FIG. 2A, and thus other details are not repeated here.

At block 540, the terminal device 120 may determine, based on the updated identity information, updated first paging occasion information associated with the first subscriber identity module. The processing in this regard is similar with that described in connection with 260 in FIG. 2A, and thus other details are not repeated here.

So far, embodiments about a solution for paging collision based on RAN and CN are described with reference to FIG. 5. Comparing with the conventional solutions based on CN, the present embodiment enables the core network 130 to be aware of the paging collision issue as early as possible, and thus reduces the access latency.

In some alternative embodiments, the terminal device 120 may receive, from the network device, an offset value with respect to the first paging, and determine the updated first paging occasion information based on the offset value. In some embodiments, the terminal device 120 may receive the offset value in a RRC signaling from the network device 110. In some embodiments, the terminal device 120 may receive the offset value in at least one of a RRC reconfiguration message and a RRC release message. This will be described in more detail with reference to FIG. 6.

Figure 6:
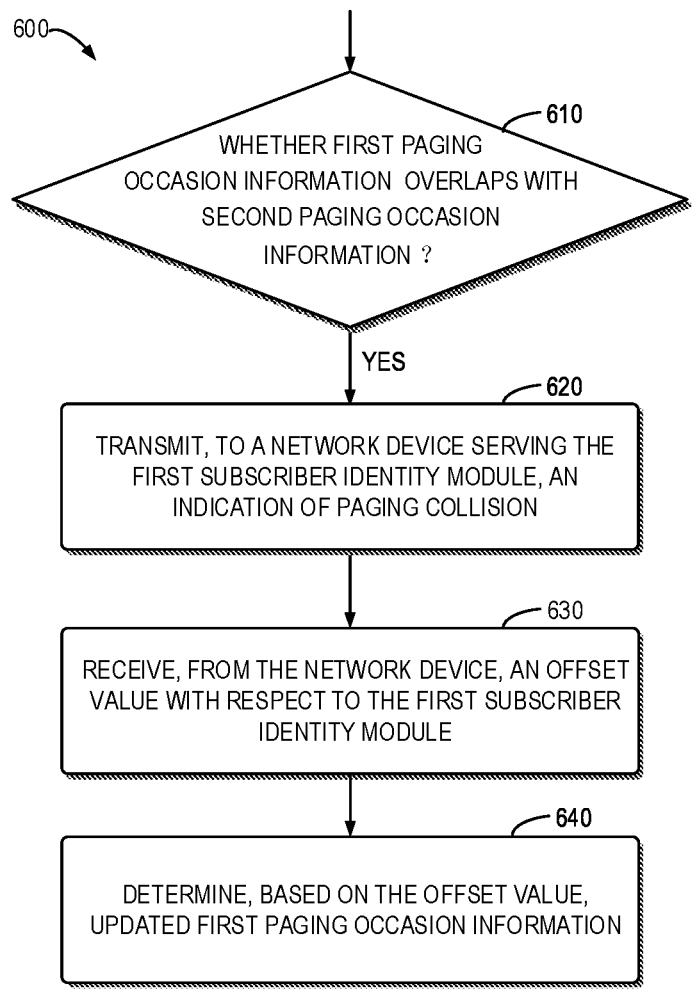
FIG. 6 illustrates another example method of communication implemented at a terminal device in accordance with some embodiments of the present disclosure.

FIG. 6 illustrates another example method 600 of communication implemented at a terminal device in accordance with some embodiments of the present disclosure. For example, the method 600 may be performed at the terminal device 120 as shown in FIG. 1. For the purpose of discussion, in the following, the method 600 will be described with reference to FIG. 1. It is to be understood that the method 600 may include additional blocks not shown and/or may omit some blocks as shown, and the scope of the present disclosure is not limited in this regard. In this embodiment, the first paging is associated with a first subscriber identity module (such as the first USIM card 121) of the terminal device 120, and the second paging is associated with a second subscriber identity module (such as the second USIM card 122) of the terminal device 120.

As shown in FIG. 6, at block 610, the terminal device 120 may determine whether first paging occasion information associated with the first subscriber identity module 6 overlaps with second paging occasion information associated with the second subscriber identity module. The processing in this regard is similar with that described in connection with 310 in FIG. 3, and thus other details are not repeated here.

If determining at block 610 that the first paging occasion information overlaps with second paging occasion information, at block 620, the terminal device 120 may transmit an indication of the paging collision to a network device (such as the network device 110) serving the first subscriber identity module (such as the first USIM card 121).

In some embodiments, the terminal device 120 may transmit the indication in a RRC signaling. In some embodiments in which the terminal device 120 is in an idle state, the terminal device 120 may transmit the indication by using an establishment cause in RRC setup request message. In some embodiments in which the terminal device 120 is in an inactive state, the terminal device 120 may transmit the indication by using a resume cause in RRC resume request message. In some alternative embodiments, the terminal device 120 may transmit the indication by using afield in a UEAssistanceInformation message.

In some embodiments, the terminal device 120 may only transmit the indication once in response to the network device being the last serving network device before an inactivation of the terminal device and a further network device associated with the second paging being unchanged. In other words, the terminal device 120 may only initiate the RRC connection for paging collision issue once in the current cell.

In some embodiments, the terminal device 120 may determine 311 a candidate for an offset value with respect to the first paging, and transmit 320 the candidate to the network device 110. In this way, it may provide a reference for the network device 110 to determine the final offset value. The processing in block 620 is similar with that described in connection with 320 in FIG. 3, and thus other details are not repeated here.

At block 630, the terminal device 120 may receive, from the network device 110, the offset value with respect to the second paging occasion information. The offset value is determined by the network device 110 in response to receiving the indication.

In some embodiments, the terminal device 120 may receive the offset value in a RRC signaling from the network device 110. For example, in some embodiments, the terminal device 120 may determine the offset value from at least one of a RRC reconfiguration message and a RRC release message. The processing in block 630 is similar with that described in connection with 340 in FIG. 3, and thus other details are not repeated here.

At block 640, the terminal device 120 may determine, based on the offset value, updated first paging occasion information associated with the first subscriber identity module. The processing in block 640 is similar with that described in connection with 350 in FIG. 3, and thus other details are not repeated here.

In some embodiments, in response to the terminal device 120 moving from the first network device (the network device 110) to a second network device (the network device 111), the terminal device 120 may reuse the offset value to determine the updated first paging occasion information. The second network device may have the same paging configuration as that of the first network device.

In some embodiments, the terminal device 120 may receive a list of at least one second network device from the first network device (the network device 110), the at least one second network device having the same paging configuration as that of the first network device. In some embodiments in which the terminal device 120 moves from the first network device to one of the at least one second network device in the list, the terminal device 120 may reuse the offset value to determine the updated first paging occasion information. In some embodiments in which the terminal device moves from the first network device to a third network device other than the at least one second network device, using a predetermined value to determine the updated first paging occasion information. The processing in this regard is similar with that described in connection with 382 and 383 in FIG. 3, and thus other details are not repeated here.

So far, embodiments about a solution for paging collision based on only RAN are described with reference to FIG. 6. Comparing with the conventional solutions based on CN, the present embodiment enables the paging collision issue to be solved by the AS layer and transparent to the NAS layer, and the procedure is low latency and more efficient. Further, the offset value can be propagated and reused among neighboring network devices through RAN paging or CN paging, and thus the low latency and high efficiency of the procedure may be enhanced.

Figure 7:
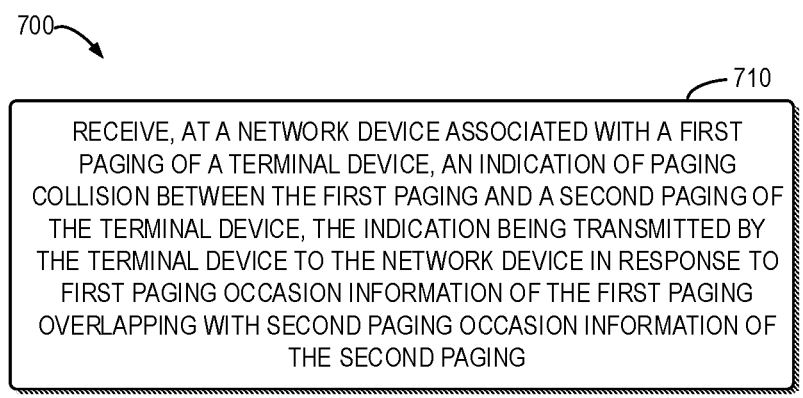
FIG. 7 illustrates an example method of communication implemented at a network device in accordance with some embodiments of the present disclosure.

FIG. 7 illustrates an example method 700 of communication implemented at a network device in accordance with some embodiments of the present disclosure. For example, the method 700 may be performed at the network device 110 as shown in FIG. 1. For the purpose of discussion, in the following, the method 700 will be described with reference to FIG. 1. It is to be understood that the method 700 may include additional blocks not shown and/or may omit some blocks as shown, and the scope of the present disclosure is not limited in this regard.

As shown in FIG. 7, at block 710, the network device 110 may receive, from the terminal device 120, an indication of paging collision between a first paging and a second paging of the terminal device 120. The indication is transmitted by the terminal device 120 to the network device in response to first paging occasion information of the first paging overlapping with second paging occasion information of the second paging.

In some embodiments, the network device 110 may receive the indication in a RRC signaling. In some embodiments in which the terminal device 120 is in an idle state, the network device 110 may receive the indication by using an establishment cause in RRC setup request message. In some embodiments in which the terminal device 120 is in an inactive state, the network device 110 may receive the indication by using a resume cause in RRC resume request message. In some embodiments, the network device 110 may only receive the indication once in response to the network device being the last serving network device before an inactivation of the terminal device and a further network device associated with the second paging being unchanged.

In some embodiments, the network device 110 may determine an offset value with reference to the first paging, and transmit the offset value to the terminal device for determination of updated first paging occasion information. This will be described in more detail with reference to FIG. 8.

Figure 8:
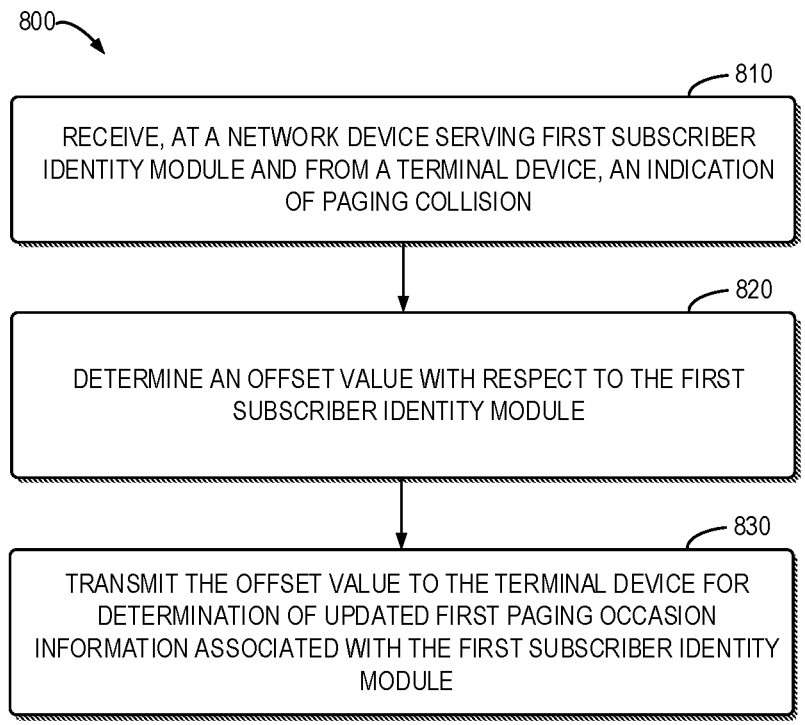
FIG. 8 illustrates another example method of communication implemented at a network device in accordance with some embodiments of the present disclosure.

FIG. 8 illustrates another example method 800 of communication implemented at a network device in accordance with some embodiments of the present disclosure. For example, the method 800 may be performed at the network device 110 as shown in FIG. 1. For the purpose of discussion, in the following, the method 800 will be described with reference to FIG. 1. It is to be understood that the method 800 may include additional blocks not shown and/or may omit some blocks as shown, and the scope of the present disclosure is not limited in this regard. In this embodiment, the first paging is associated with a first subscriber identity module (such as the first USIM card 121) of the terminal device 120, and the second paging is associated with a second subscriber identity module (such as the second USIM card 122) of the terminal device 120.

As shown in FIG. 8, at block 810, the network device 110 may receive, from a terminal device (such as the terminal device 120) carrying the first subscriber identity module (such as the first USIM card 121) and a second subscriber identity module (such as the second USIM card 122), an indication of paging collision between the first and second subscriber identity modules.

In some embodiments, the network device 110 may receive the indication in a RRC signaling. In some embodiments in which the terminal device 120 is in an idle state, the network device 110 may receive the indication by using an establishment cause in RRC setup request message. In some embodiments in which the terminal device 120 is in an inactive state, the network device 110 may receive the indication by using a resume cause in RRC resume request message.

In some alternative embodiments, the network device 110 may receive the indication by using afield in a UEAssistanceInformation message. In some embodiments in which the network device 110 is the last serving network device before an inactivation of the terminal device and a further network device associated with the second paging is unchanged, the network device 110 may only receive the indication once in current cell.

At block 820, the network device 110 may determine an offset value with respect to the first paging. In some embodiments, the network device 110 may receive a candidate for the offset value from the terminal device 120, and determine the offset value based on the candidate. In some embodiments, the network device 110 may receive the second paging occasion information from the terminal device 120, and determine the offset value based on the second paging occasion information. The processing in this regard is similar with that described in connection with 350 in FIG. 3, and thus other details are not repeated here.

At block 830, the network device 110 may transmit the offset value to the terminal device 120 for determination of updated first paging occasion information associated with the first subscriber identity module. In some embodiments, the network device 110 may transmit the offset value in a RRC signaling. For example, in some embodiments, the network device 110 may transmit the offset value in at least one of a RRC reconfiguration message and a RRC release message. The processing in this regard is similar with that described in connection with 360 in FIG. 3, and thus other details are not repeated here.

In some embodiments, the network device 110 is a first network device, and the network device 110 may transmit the offset value and the identity information of the first subscriber identity module to a core network element (such as the core network element 131 in FIG. 1), for the core network element 131 to transmit the offset value and the identity information of the first subscriber identity module in a paging message. The processing in this regard is similar with that described in connection with 360 in FIG. 3, and thus other details are not repeated here.

In some alternative embodiments, the network device 110 may transmit the offset value and the identity information of the first subscriber identity module to the at least one second network device having the same paging configuration as that of the first network device for determination of updated paging configuration. The processing in this regard is similar with that described in connection with 362 in FIG. 3, and thus other details are not repeated here.

In some embodiments, the network device 110 may determine a list of the at least one second network device having the same paging configuration as that of the first network device, and transmit the list to the terminal device 120. The processing in this regard is similar with that described in connection with 380 and 381 in FIG. 3, and thus other details are not repeated here.

In some embodiments, the network device 110 may transmit, to a core network element, a first message indicating the paging collision and comprising identity information associated with the first paging, for the core network element to assign updated identity information associated with the first paging to the terminal device. This will be described in more detail with reference to FIG. 9.

Figure 9:
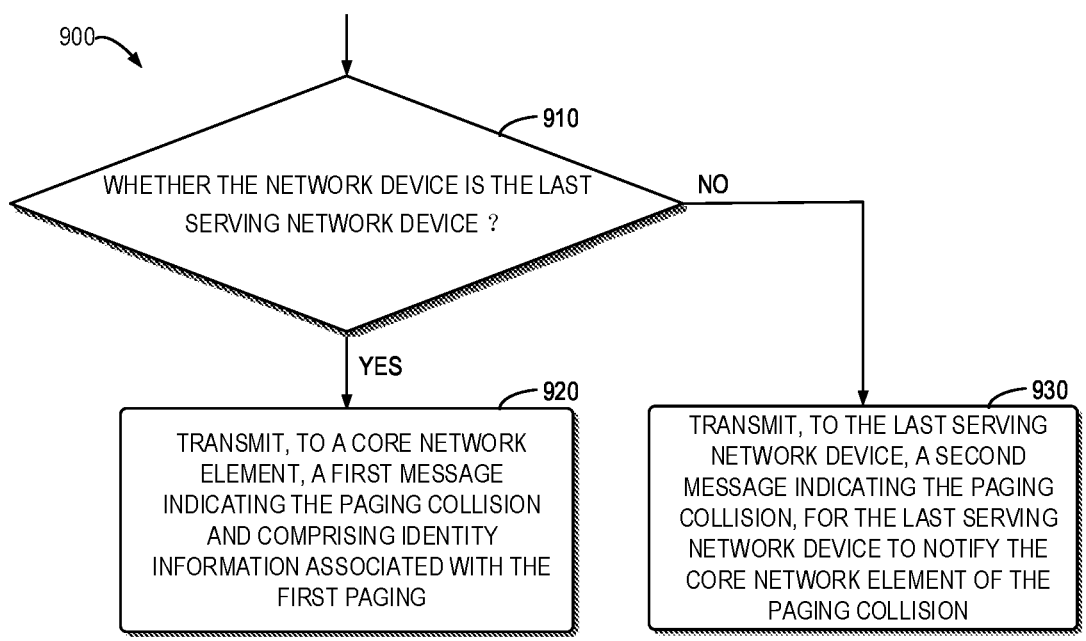
FIG. 9 illustrates another example method of communication implemented at a network device in accordance with some embodiments of the present disclosure.

FIG. 9 illustrates another example method 900 of communication implemented at a network device in accordance with some embodiments of the present disclosure. For example, the method 900 may be performed at the network device 110 as shown in FIG. 1. For the purpose of discussion, in the following, the method 900 will be described with reference to FIG. 1. It is to be understood that the method 900 may include additional blocks not shown and/or may omit some blocks as shown, and the scope of the present disclosure is not limited in this regard. In this embodiment, the first paging is associated with a first subscriber identity module (such as the first USIM card 121) of the terminal device 120, and the second paging is associated with a second subscriber identity module (such as the second USIM card 122) of the terminal device 120.

As shown in FIG. 9, at block 910, the network device 110 may determine whether the network device 110 is the last serving network device before an inactivation of the terminal device 120. If determining at block 910 that the network device 110 is the last serving network device before an inactivation of the terminal device 120, at block 920, the network device 110 may transmit, to a core network element 131, a first message indicating the paging collision and comprising identity information of the first subscriber identity module, for the core network element 131 to assign updated identity information of the first subscriber identity module to the terminal device 120.

If determining at block 910 that the network device 110 is not the last serving network device, at block 930, the network device 110 may transmit, to the last serving network device (such as the network device 111), a second message indicating the paging collision, for the last serving network device to notify the core network element 131 of the paging collision. In some embodiments, the network device 110 may transmit the second message by using a resume cause in a RetrieveUEContextRequest message. The processing in this regard is similar with that described in connection with 231' in FIG. 2B, and thus other details are not repeated here.

Figure 10:
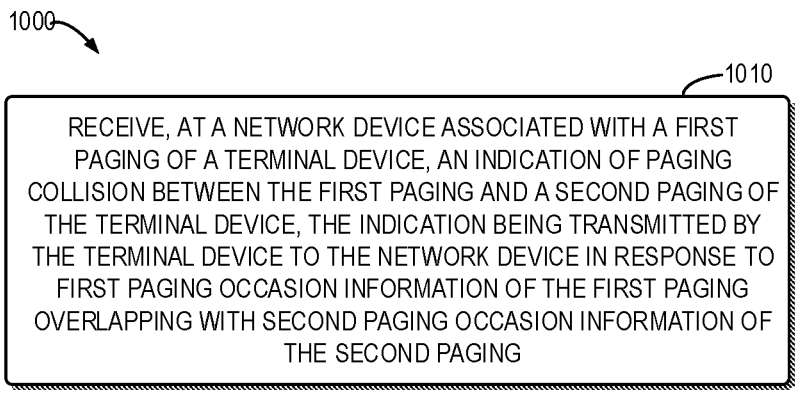
FIG. 10 illustrates an example method of communication implemented at a core network element in accordance with some embodiments of the present disclosure.

FIG. 10 illustrates an example method 1000 of communication implemented at a core network element in accordance with some embodiments of the present disclosure. For example, the method 1000 may be performed at the core network element 131 as shown in FIG. 1. For the purpose of discussion, in the following, the method 1000 will be described with reference to FIG. 1. It is to be understood that the method 1000 may include additional blocks not shown and/or may omit some blocks as shown, and the scope of the present disclosure is not limited in this regard.

As shown in FIG. 10, at block 1010, the core network element 131 may receive, from a network device (such as the network device 110) associated with a first paging, a first message indicating paging collision between the first paging and a second paging and comprising identity information associated with the first paging. In this embodiment, the network device 110 may be the last serving network device before an inactivation of the terminal device 120.

Based on the first message, the core network element 131 may assign, to the terminal device 120, updated identity information associated with the first paging. This will be described in more detail with reference to FIG. 11.

Figure 11:
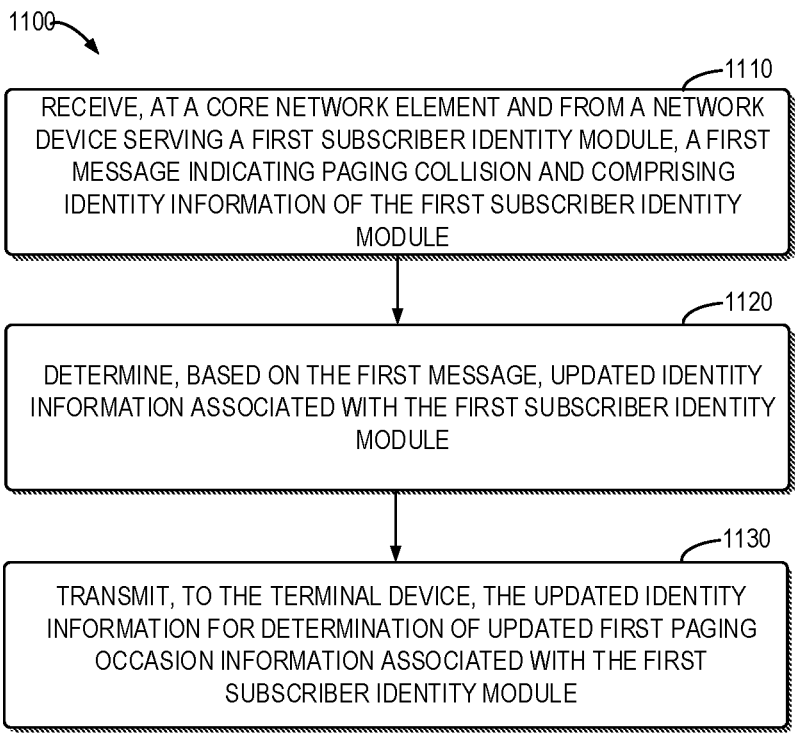
FIG. 11 illustrates another example method of communication implemented at a core network element in accordance with some embodiments of the present disclosure.

FIG. 11 illustrates another example method 1100 of communication implemented at a core network element in accordance with some embodiments of the present disclosure. For example, the method 1100 may be performed at the core network element 131 as shown in FIG. 1. For the purpose of discussion, in the following, the method 1100 will be described with reference to FIG. 1. It is to be understood that the method 1100 may include additional blocks not shown and/or may omit some blocks as shown, and the scope of the present disclosure is not limited in this regard. In this embodiment, the first paging is associated with a first subscriber identity module (such as the first USIM card 121) of the terminal device 120, and the second paging is associated with a second subscriber identity module (such as the second USIM card 122) of the terminal device 120.

As shown in FIG. 11, at block 1110, the core network element 131 may receive, from a network device (such as the network device 110) serving a first subscriber identity module (such as the first USIM card 121), a first message indicating paging collision between the first subscriber identity module and a second subscriber identity module (such as the first USIM card 122) and comprising identity information of the first subscriber identity module. In some embodiments, the network device may be the last serving network device before an inactivation of the terminal device 120.

At block 1120, the core network element 131 may determine, based on the first message, updated identity information associated with the first subscriber identity module. At block 1130, the core network element 131 may transmit, to the terminal device 120, the updated identity information for determination of updated first paging occasion information associated with the first subscriber identity module. In some embodiments, the core network device 130 may transmit the updated identity information to the terminal device 120 through a NAS procedure. It should be noted that any other suitable manners also can be used to transmit the updated identity information from the core network device 130 to the terminal device 120, and the present application does not make limitation for this.

Figure 12:
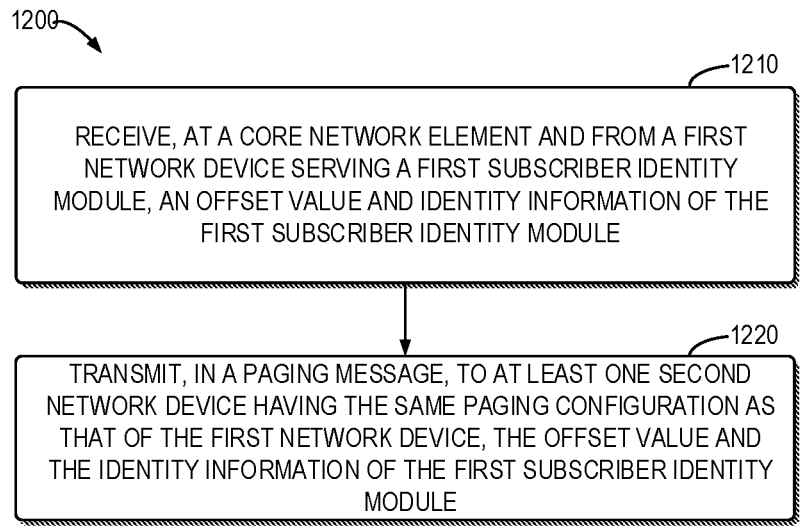
FIG. 12 illustrates another example method of communication implemented at a core network element in accordance with some embodiments of the present disclosure.

FIG. 12 illustrates another example method 1200 of communication implemented at a core network element in accordance with some embodiments of the present disclosure. For example, the method 1200 may be performed at the core network element 131 as shown in FIG. 1. For the purpose of discussion, in the following, the method 1200 will be described with reference to FIG. 1. It is to be understood that the method 1200 may include additional blocks not shown and/or may omit some blocks as shown, and the scope of the present disclosure is not limited in this regard. In this embodiment, the first paging is associated with a first subscriber identity module (such as the first USIM card 121) of the terminal device 120, and the second paging is associated with a second subscriber identity module (such as the second USIM card 122) of the terminal device 120.

As shown in FIG. 12, at block 1210, the core network element 131 may receive, from a first network device (such as the network device 110 in FIG. 1) serving a first subscriber identity module (such as the first USIM card 121 in FIG. 1), an offset value and identity information of the first subscriber identity module. In some embodiments, the offset value may be determined by the first network device and in response to receiving an indication of paging collision from a terminal device (such as the terminal device 120 in FIG. 1). The processing in this regard is similar with that described in connection with 360 in FIG. 3, and thus other details are not repeated here.

At block 1120, the core network element 131 may transmit, in a paging message, the offset value and the identity information of the first subscriber identity module for determination of updated first paging occasion information associated with the first subscriber identity module. The processing in this regard is similar with that described in connection with 361 in FIG. 3, and thus other details are not repeated here.

Figure 13:
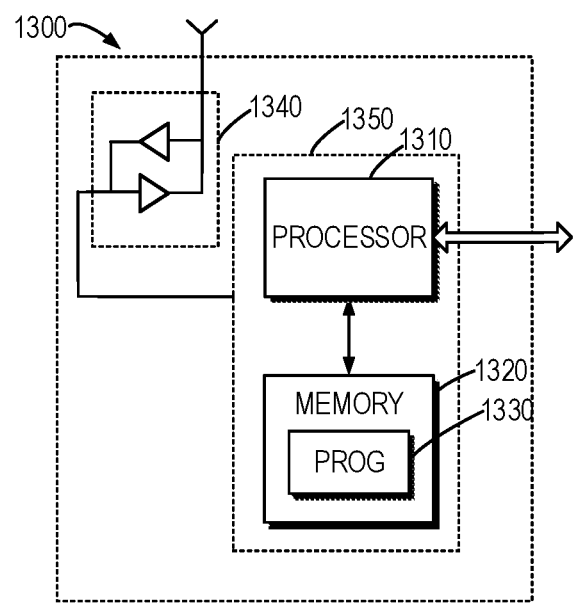
FIG. 13 is a simplified block diagram of a device that is suitable for implementing embodiments of the present disclosure.

FIG. 13 is a simplified block diagram of a device 1300 that is suitable for implementing embodiments of the present disclosure. The device 1300 can be considered as a further example implementation of the network device 110, the terminal device 120, or the core network element 131 as shown in FIG. 1. Accordingly, the device 1300 can be implemented at or as at least a part of the network device 110, the terminal device 120, or the core network element 131.

As shown, the device 1300 includes a processor 1310, a memory 1320 coupled to the processor 1310, a suitable transmitter (TX) and receiver (RX) 1340 coupled to the processor 1310, and a communication interface coupled to the TX/RX 1340. The memory 1310 stores at least a part of a program 1330. The TX/RX 1340 is for bidirectional communications. The TX/RX 1040 has at least one antenna to facilitate communication, though in practice an Access Node mentioned in this application may have several ones.

The communication interface may represent any interface that is necessary for communication with other network elements, such as X2/Xn interface for bidirectional communications between eNBs/gNBs, S1/NG interface for communication between a Mobility Management Entity (MME)/Access and Mobility Management Function (AMF)/SGW/UPF and the eNB/gNB, Un interface for communication between the eNB/gNB and a relay node (RN), or Uu interface for communication between the eNB/gNB and a terminal device.

The program 1330 is assumed to include program instructions that, when executed by the associated processor 1310, enable the device 1300 to operate in accordance with the embodiments of the present disclosure, as discussed herein with reference to FIGS. 1 to 12.

The embodiments herein may be implemented by computer software executable by the processor 1310 of the device 1300, or by hardware, or by a combination of software and hardware. The processor 1310 may be configured to implement various embodiments of the present disclosure. Furthermore, a combination of the processor 1310 and memory 1320 may form processing means 1350 adapted to implement various embodiments of the present disclosure.

The memory 1320 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1320 is shown in the device 1300, there may be several physically distinct memory modules in the device 1300. The processor 1310 may be of any type suitable to the local technical network, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 4 to 9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of communication performed by a terminal device, the method comprising:
   determining a paging collision where a first paging occasion of a first paging Universal Subscriber Identity Module (USIM) overlaps with a second paging occasion of a second USIM;
   transmitting a candidate offset value to a network device;
   receiving, from the network device, an offset value which is provided based on the candidate offset value;
   determining a second identity of the terminal device, based on a first identity of the terminal device and the offset value, wherein the first identity is an International Mobile Subscriber Identity (IMSI); and
   determining, based on the second identity, a third paging occasion to avoid the paging collision.

2. The method of claim 1, wherein transmitting the candidate offset value comprises:
   transmitting the candidate offset value using a radio resource control (RRC) signaling.

3. The method of claim 1, wherein the offset value is determined based on the candidate offset value.

4. A method of communication performed by a network device, the method comprising:
   receiving from a terminal device, a candidate offset value corresponding to a paging collision in which a first paging occasion of a first Universal Subscriber Identity Module (USIM) overlaps with a second paging occasion of a second USIM; and
   providing an offset value to the terminal device based on the candidate offset value,
   wherein a second identity of the terminal device is determined based on a first identity of the terminal device and the offset value,
   wherein the first identity is an International Mobile Subscriber Identity (IMSI), and
   wherein a third paging occasion to avoid the paging collision is determined based on the second identity.

5. The method of claim 4, wherein the candidate offset value is received using a radio resource control (RRC) signaling.

6. The method of claim 4,
   wherein
   an updated first paging occasion is determined based on the second identity.

7. The method of claim 6, wherein the offset value is determined based on the candidate offset value.

8. A terminal device comprising:
   a transceiver; and
   a processor,
   wherein the processor is configured to:
   determine a paging collision where a first paging occasion of a first paging Universal Subscriber Identity Module (USIM) overlaps with a second paging occasion of a second USIM;
   control the transceiver to transmit a candidate offset value to a network device;
   control the transceiver to receive, from the network device, an offset value which is provided based on the candidate offset value;
   determine a second identity of the terminal device, based on a first identity of the terminal device and the offset value, wherein the first identity is an International Mobile Subscriber Identity (IMSI); and
   determine, based on the second identity, a third paging occasion to avoid the paging collision.

9. The terminal device of claim 8, wherein transmitting the candidate offset value comprises:
   transmitting the candidate offset value using a radio resource control (RRC) signaling.

10. The terminal device of claim 8, wherein the offset value is determined based on the candidate offset value.

* * * * *